United States Patent Office.

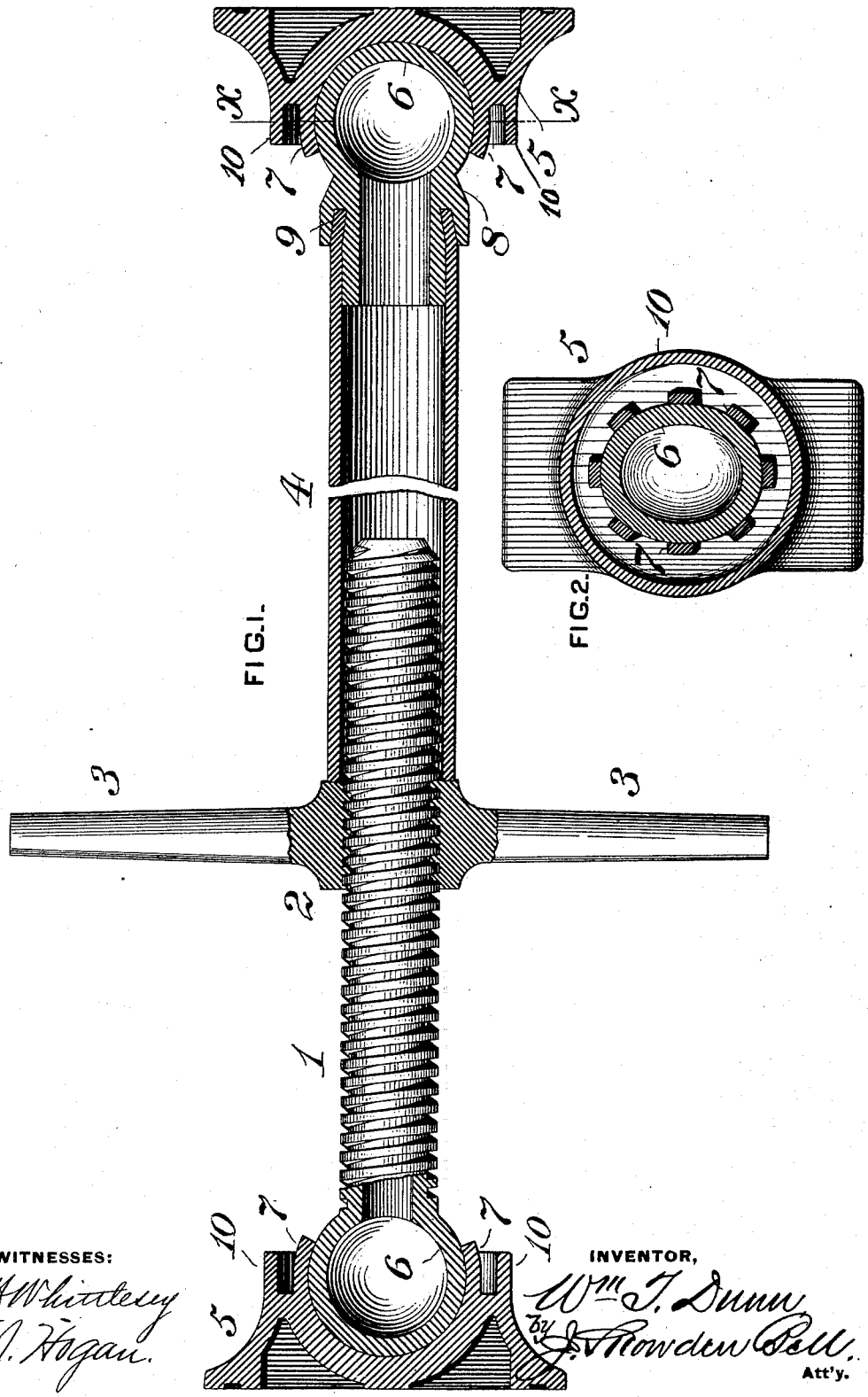

WILLIAM T. DUNN, OF PITTSBURG, PENNSYLVANIA.

BRACE FOR EXCAVATIONS.

SPECIFICATION forming part of Letters Patent No. 483,737, dated October 4, 1892.

Application filed June 24, 1892. Serial No. 437,892. (No model.)

*To all whom it may concern:*

Be it known that I, WILLIAM T. DUNN, a citizen of the United States, residing at Pittsburg, in the county of Allegheny and State of Pennsylvania, have invented or discovered a certain new and useful Improvement in Braces for Excavations, of which improvement the following is a specification.

My present invention relates to extensible braces for supporting the walls of excavations, and is an improvement upon that set forth in Letters Patent of the United States No. 168,085, granted and issued to James P. Silliman and myself under date of September 28, 1875.

The objects of my invention are to provide a simple, secure, and inexpensive connection of the sleeve or tubular extension of the operating-nut with a ball or curved-face joint member, which it carries, and to simplify and perfect the connection of the self-adjusting shoes with the extensible parts of the appliance.

To these ends my invention, generally stated, consists in the combination of a ball or male joint member provided with a lateral extension having an inwardly tapered or inclined annular socket and a sleeve connected at one end to a nut and fitting at its opposite end in said socket; also, in the combination of a socketed shoe having a series of lips or projections on the periphery of its socket, a protecting-flange inclosing said lips, and a ball or curved-face joint member fitting said socket and held therein by the inward bending of said lips; also, in the combination of an oblong or spheroidal ball or curved-face joint member and a shoe having a recess adapted to fit said ball.

The improvement claimed is hereinafter fully set forth.

In the accompanying drawings, Figure 1 is a longitudinal central section through an extensible brace for excavations, illustrating an application of my invention; and Fig. 2, a transverse section at the line *x x* of Fig. 1.

In the practice of my invention I provide, as in Patent No. 168,085 aforesaid, an extensible brace having a screw or threaded stem 1 and a nut 2, engaging the thread of said stem, and provided with operating-arms 3 and with a sleeve or tubular extension 4, which is secured to and projects from the nut 2 concentrically with the threaded stem 1. Self-adjusting shoes 5 are flexibly connected, as presently to be described, to the stem 1 and sleeve 4, respectively, and are adapted to bear against planking on the side walls or opposite faces of an excavation in order to support and prevent the caving in of the same.

The self-adjusting shoes 5 are connected to the stem 1 and sleeve 4 by ball-joints—that is to say, joints of the well-known type in which balls or curved-face male members enter and fit freely in corresponding sockets. In order to prevent rotation of the stem or the sleeve in the connected shoe, while admitting of any desired range of angular adjustment of the latter, the balls 6 are made of oblong, spheroidal, or laterally-flattened form, as illustrated in Fig. 2, and fit in correspondingly-formed sockets in the shoes 5. Each of said shoes is provided with a series of lips or projections 7, projecting from the periphery of the socket around its outer edge. The shoes are formed of malleable iron or other material having a sufficient degree of flexibility to admit of bending the lips 7 inwardly upon the balls, as shown in Fig. 1, the balls being thereby retained in the sockets without liability to displacement and without the necessity of employing the ordinary caps, and this without in any wise impairing the flexibility of the joint.

In order to guard against breakage of the lips 7 in service, they are inclosed by a protecting-flange 10, which is formed on and projects outwardly from the body of the shoe 5, surrounding the socket, sufficient space being left between the flange 10 and lips 7 to admit of the inward bending of the latter.

The ball of the threaded stem is preferably, as shown, formed integral therewith; but that of the sleeve 4 is usually made separate therefrom, and in such case is connected thereto by means of a lateral extension 8, having in its outer end an annular groove or socket 9, which is inwardly tapered or inclined toward the center of the ball. The adjacent end of the sleeve 4 is driven into the socket 9, by the inclined form of which it is inwardly compressed, and the sleeve and ball are held firmly together without necessitating rivets or other extraneous connecting members.

I claim as my invention and desire to secure by Letters Patent—

1. The combination, in a brace for excavations, of a ball or male joint member provided with a lateral extension having an inwardly tapered or inclined annular socket, a sleeve fitting at one end in said socket, a nut secured to the opposite end of said sleeve, and a threaded stem engaging said nut, substantially as set forth.

2. The combination, in a brace for excavations, of a socketed shoe having a series of inwardly curved or bent lips or projections on the periphery of its socket, a protecting-flange inclosing said lips, and a ball or curved-face male joint member fitting said socket and held therein by said lips or projections, substantially as set forth.

3. The combination, in a brace for excavations, of an oblong or spheroidal ball or continuously-curved-face male joint member and a shoe having a recess adapted to fit said ball, substantially as set forth.

In testimony whereof I have hereunto set my hand.

WILLIAM T. DUNN.

Witnesses:
J. SNOWDEN BELL,
W. B. CORWIN.